United States Patent
Knauer

(10) Patent No.: US 10,975,837 B2
(45) Date of Patent: Apr. 13, 2021

(54) ROTOR BLADE SHAPED TO ENHANCE WAKE DIFFUSION

(71) Applicant: EQUINOR ASA, Stavanger (NO)

(72) Inventor: Andreas Knauer, Lysekloster (NO)

(73) Assignee: EQUINOR ASA, Stavanger (NO)

(*) Notice: Subject to any disclaimer, the term of this patent is extended or adjusted under 35 U.S.C. 154(b) by 24 days.

(21) Appl. No.: 15/580,519

(22) PCT Filed: Jun. 10, 2016

(86) PCT No.: PCT/NO2016/050125
§ 371 (c)(1),
(2) Date: Dec. 7, 2017

(87) PCT Pub. No.: WO2016/200277
PCT Pub. Date: Dec. 15, 2016

(65) Prior Publication Data
US 2018/0171967 A1     Jun. 21, 2018

(30) Foreign Application Priority Data
Jun. 10, 2015   (GB) ..................................... 1510113

(51) Int. Cl.
F03D 1/06     (2006.01)

(52) U.S. Cl.
CPC .... F03D 1/0633 (2013.01); *F05B 2240/2211* (2013.01); *F05B 2240/30* (2013.01);
(Continued)

(58) Field of Classification Search
CPC ........ F03D 1/0633; F03D 1/04; F03D 1/0641; F05B 2240/2211; F05B 2240/30
(Continued)

(56) References Cited

U.S. PATENT DOCUMENTS

| | | | | |
|---|---|---|---|---|
| 4,150,301 A | * | 4/1979 | Bergey, Jr. ............ | F03D 1/0608 290/44 |
| 4,360,871 A | * | 11/1982 | Blaney .................. | B29C 53/584 29/889.7 |

(Continued)

FOREIGN PATENT DOCUMENTS

| | | |
|---|---|---|
| CN | 102459878 | 5/2012 |
| DE | 29 13 407 | 10/1980 |

(Continued)

OTHER PUBLICATIONS

International Search Report dated Aug. 30, 2016 in International Application No. PCT/NO2016/050125.
(Continued)

*Primary Examiner* — Nathaniel E Wiehe
*Assistant Examiner* — Jackson N Gillenwaters
(74) *Attorney, Agent, or Firm* — Wenderoth, Lind & Ponack, L.L.P.

(57) ABSTRACT

A blade 20 for a horizontal-axis wind turbine rotor comprises a radially-outer, energy-extraction portion 32 and a radially-inner, ventilation portion 30. The radially-inner ventilation portion 30 is shaped to ventilate a central area 34 of a wake of the rotor during use such that it contains more kinetic energy compared to the wake from a conventional rotor design. The increased wind flow velocity at the centre 34 of the wake generates additional shear stresses, with corresponding turbulence development, which gives rise to increased wake diffusion.

16 Claims, 9 Drawing Sheets

(52) U.S. Cl.
CPC ....... *F05B 2240/95* (2013.01); *F05B 2240/96* (2013.01); *Y02E 10/72* (2013.01)

(58) Field of Classification Search
USPC ..................................................... 416/223 R
See application file for complete search history.

(56) References Cited

U.S. PATENT DOCUMENTS

| | | | |
|---|---|---|---|
| 5,876,181 A | 3/1999 | Shin | |
| 6,951,443 B1* | 10/2005 | Blakemore | F03D 7/0224 415/4.3 |
| 7,939,961 B1* | 5/2011 | Bonnet | F03D 1/0608 290/44 |
| 9,611,833 B2* | 4/2017 | Madsen | F03D 1/0641 |
| 2009/0237399 A1* | 9/2009 | Bailey | G06T 17/20 345/420 |
| 2010/0329879 A1 | 12/2010 | Presz, Jr. et al. | |
| 2012/0057987 A1* | 3/2012 | Fuglsang | F03D 1/0641 416/241 R |
| 2012/0301283 A1 | 11/2012 | Presz et al. | |
| 2013/0224032 A1* | 8/2013 | Busbey | F03D 1/0633 416/223 R |
| 2013/0251535 A1* | 9/2013 | Koegler | F03D 1/0633 416/228 |
| 2015/0003994 A1* | 1/2015 | Braaten | F03D 1/0633 416/237 |
| 2015/0159493 A1* | 6/2015 | Corten | F03D 1/0633 416/223 R |
| 2015/0292522 A1 | 10/2015 | Singh et al. | |

FOREIGN PATENT DOCUMENTS

| | | |
|---|---|---|
| DE | 100 03 385 | 8/2001 |
| DE | 10 2012 103 626 | 10/2013 |
| EP | 2 438 299 | 4/2012 |
| FR | 2 942 508 | 8/2010 |
| GB | 172997 | 12/1921 |
| WO | 03/098034 | 11/2003 |
| WO | 2013/037374 | 3/2013 |
| WO | 2013/137716 | 9/2013 |
| WO | 2014/064195 | 5/2014 |
| WO | 2014/197912 | 12/2014 |
| WO | 2016/055076 | 4/2016 |

OTHER PUBLICATIONS

Written Opinion of the International Searching Authority dated Aug. 30, 2016 in International Application No. PCT/NO2016/050125.
F. González-Longatt et al., "Wake effect in wind farm performance: Steady-state and dynamic behavior", Renewable Energy xxx (2011) 1-10.
Chinese Office Action dated Mar. 20, 2019 in corresponding Chinese Patent Application No. 201680047206.7 with English translation.
Patents Act 1977: Search Report under Section 17 dated Dec. 3, 2015 in GB patent application No. 1510113.2.

* cited by examiner

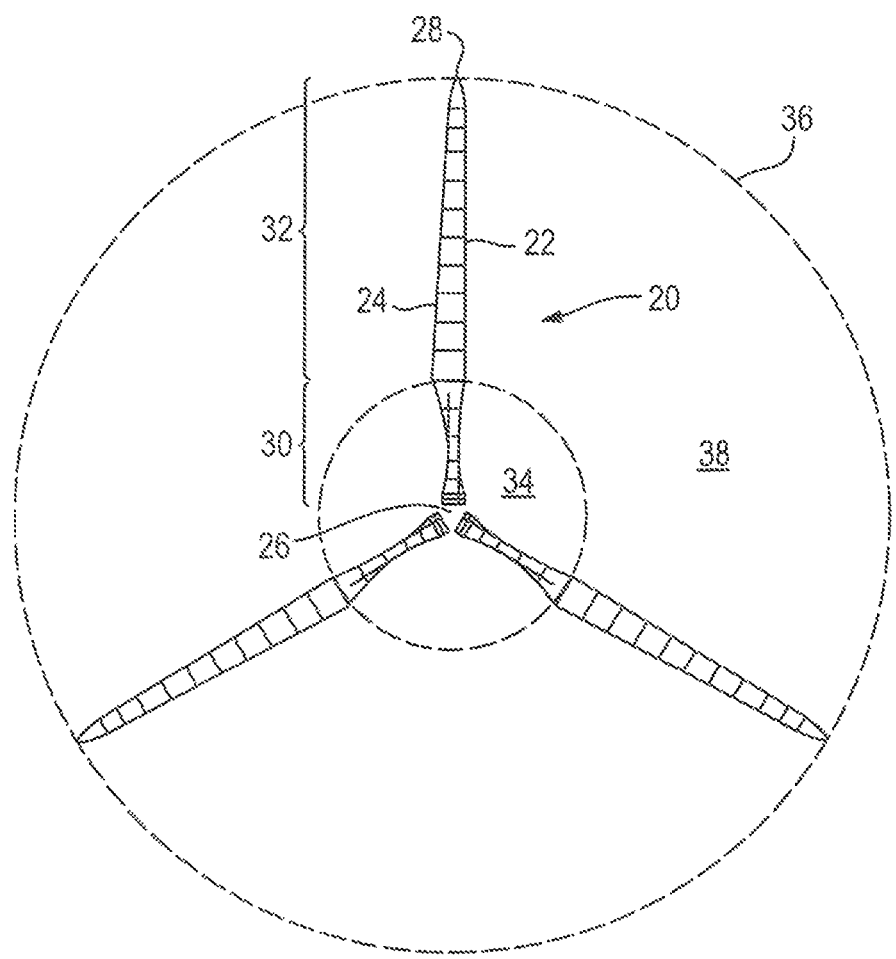

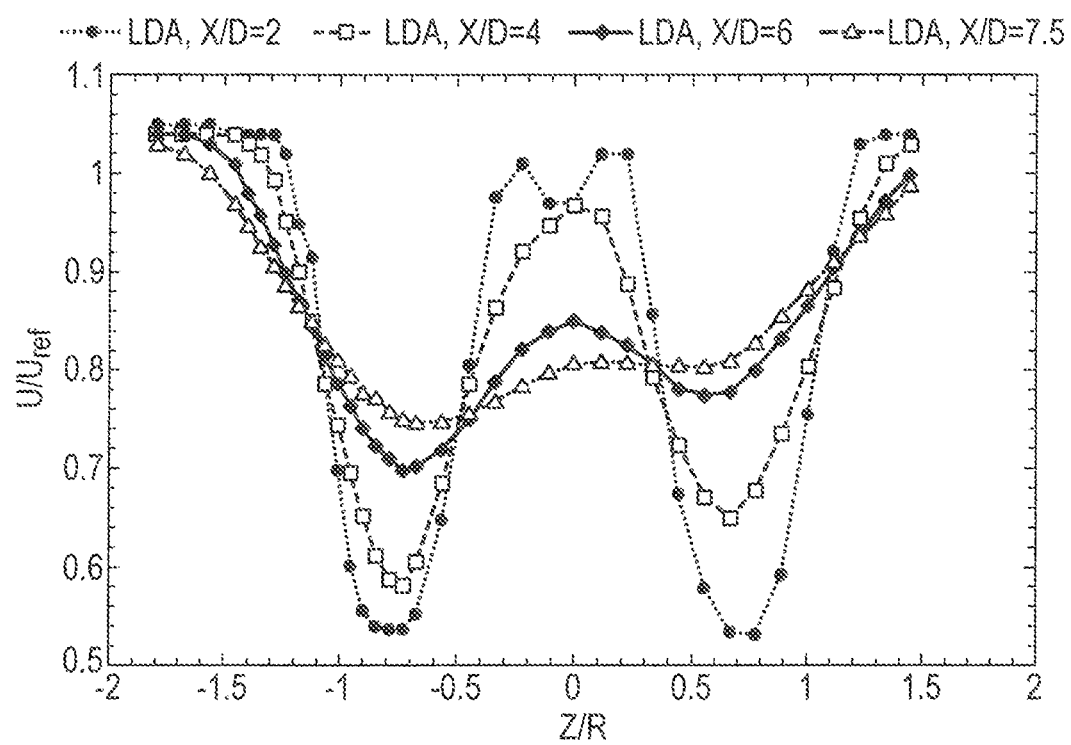

ROTOR BLADE SHAPED TO ENHANCE WAKE DIFFUSION

The present invention relates to a rotor blade for a horizontal-axis wind turbine, and particularly to a rotor blade shaped to enhance diffusion of the wind turbine wake.

Horizontal-axis wind turbines have a horizontal main rotor shaft and an electrical generator at the top of a tower. Horizontal-axis wind turbines used for commercial production of electrical power are usually three-bladed and are yawed into the wind by computer-controlled motors. The towers often range from 70 to 100 meters tall and the blades typically have a length from 50 to 75 meters. However, larger wind turbines are in development, for example having heights of up to 220 meters and blade lengths of up to 85 meters.

During operation, the velocity of the wind generates lift on the blades, causing the rotor to rotate, which in turn drives an electric generator. The extraction of energy, however, slows down the wind and causes a wake (or shadow) to form behind the turbine. The wind within the wake has a slower velocity than wind that did not pass through the rotor area. Moreover, the slower velocity of the wind in the wake relative to the velocity of the wind unaffected by the rotor causes the diameter of the wake to expand beyond the diameter of the rotor (i.e. wake expansion).

Using an array of wind turbines in a relatively small geographic region, i.e. a wind farm, offers numerous advantages, such as cheaper construction costs, shared infrastructure, and lower maintenance costs than if the same number of wind turbines were built individually. However, the proximity of the wind turbines to others within the array affects their efficiency. Specifically, the wake of one turbine will reduce the power output of a downwind turbine because the downwind turbine receives a relatively slower wind velocity.

An individual wind turbine in full wake conditions may experience a power output loss of as much as 30-40%, compared to the power output of a turbine positioned upwind. However, averaged across the entire farm, typically wake losses are around 10-15%.

Further downwind of the turbine, the wind velocity within the wake increases due to the transfer of kinetic energy from the wind surrounding the wake by turbulent mixing. Turbulent mixing occurs naturally due to the velocity difference between the air flowing inside and outside of the wake, as well as due to environmental and/or met-ocean conditions, such as the terrain roughness or wave height. Thus the problem of wake-induced efficiency loss can be reduced by separating the wind turbines further apart, thereby increasing the efficiency of the array.

For this reason, in most offshore wind turbine farms, a turbine spacing of about 6 to 10 rotor diameters is normal. In practice, this spacing defines the upper limit for the most efficient power production of the farm. It would be desirable to increase the efficiency of the wind turbines in the array, and hence the power output of the wind farm, without increasing the area of the wind farm.

WO 2013/037374 proposes a method of reducing the effects of a wind turbine wake on downstream turbines by adjusting the cross-sectional shape of the wake. This is achieved by periodically altering the pitch of the blades during rotation, such that less energy is extracted from two opposing sides of the wake, giving rise to an oval-shaped wake. Whilst this reduces the effect of the wake on downstream turbines, it will result in a significant loss of efficiency for individual turbines due to the large swept areas achieving lower energy extraction.

The present invention provides a blade for a horizontal-axis wind turbine rotor, the blade comprising a radially-outer energy-extraction portion and a radially-inner ventilation portion, the radially-inner ventilation portion being shaped to, in use, ventilate a central area of a wake of the rotor by extracting low levels of energy from the wind. Optionally, the blade may in some embodiments further add a slight amount of energy to the flow, i.e. by acting as a propeller.

This blade configuration means that the centre of the turbine wake contains more kinetic energy compared to the wake from a conventional rotor design. This increased wind flow velocity at the centre of the wake generates additional shear stresses, with corresponding turbulence development, which gives rise to increased wake diffusion. It should be appreciated that "extracting low levels of energy" refers not only to extraction of useful energy to drive the turbine, but also to energy extraction due to drag or the like. For example, a root section having a circular shape will generate significant drag, which extracts energy from the flow and decreases ventilation. It will also be appreciated that such a circular shape cannot be used to generate lift to add energy to the flow.

The main effect of the ventilation (by bypass or injection) of flow through the radially-inner area, aside from the slight pressure increase in the near-wake regime by mass addition of the vented air, is an addition of momentum from the jet emanating from the rear of the turbine. This jet flow, driven by the pressure difference between the increased pressure upstream of the rotor and the resulting lower pressure downstream of the rotor, increases the speed of the air at the centre of the wake.

It has been found that, by introducing a small jet of relatively high speed air into the wake (the downwind wind speed of the jet will be only slightly lower than the freestream wind speed), significant diffusion of the wake can be achieved without significantly decreasing the efficiency of the turbine (e.g. where the radially-inner portion is 25% of the blade, this is equivalent to only about 6% loss of turbine efficiency). Indeed, in one embodiment, the central area of the wake immediately downwind of the rotor has a wind speed at least 80% of the wind speed immediately upwind of the rotor.

Preferably, the radially-inner portion has an axial length of between 15% and 40% of the length of the blade, and preferably between 20% and 30% of the length of the blade, and most preferably between 20% and 25% of the length of the blade. Preferably the radially-outer portion has an axial length of at least 40% and preferably at least 50% of the length of the blade.

It is noted that the terms radially-outer and radially-inner are relative to one another and as such may not be the radially-outermost and radially-innermost portions of the rotor. In particular, the radially-outer portion may not include a tip portion of the blade, where tip effects must be accounted for. Also, a transition portion may be provided between the radially inner portion and the radially-outer portion. The transition portion preferably transitions smoothly from a local blade twist angle and/or aerodynamic shape of the radially-outer portion to a local blade twist angle and/or aerodynamic shape of the radially-inner portion.

The greater the length of the radially-inner portion, the greater the ventilation effect and the more effective the dissipation of the wake. However, if too great a portion of the swept area has low energy extraction, then the loss of efficiency of the individual wind turbines outweighs the benefit of reduced wake effects on downstream. Also, if the ventilation area is large, then secondary effects such as tip and root vortices will become more prominent. The above ranges have been found to be optimum to achieve maximum efficiency across an array of turbines.

The maximum effect is achieved when the wind passes essentially unimpeded through the radially-inner portion of the rotor. Thus, the radially-inner portion of the blade is preferably shaped to extract minimal energy and cause minimal drag. In one embodiment, the radially-inner portion of the blade is shaped so as to, in use, extract less than 2% of the energy extracted by the blade.

The radially-inner portion of the blade is preferably twisted from an optimal blade angle for extracting energy from the wind. That is to say, the radially-inner portion has a local blade twist angle that is not at the optimum angle for maximum energy extraction. This is contrary to conventional turbine blades where a radially inner portion extracts slightly lower energy due to the decreased chord length for manufacturing or complexity reasons. Typically, such prior art blades will still seek to extract maximum energy within their design constraints, and so will still be oriented at an optimal local blade twist angle. Such blades do not create a ventilation effect sufficient to enhance diffusion of the wake. They further do not act as a propeller in the inner sections to add or redistribute energy in the rotor plane.

The radially-inner portion of the blade is preferably shaped such that, in use, when the rotor is operating at its maximum power coefficient (i.e. at the rotor's designed TSR), the rotor achieves an average power coefficient of below 15% for the area swept by the radially-inner portion, and preferably below 10%. The radial inner portion can be shaped to act as propeller for off-design conditions, for example when the blade is operated above the design TSR.

A "power coefficient" ($C_p$) is a measurement of the efficiency of energy extraction. The power coefficient is the ratio of extracted power to the wind power, for a given swept area. A power coefficient can be calculated for the entire swept area or for only a portion of the area, such as the annulus swept by a segment of blade.

Although it can be exceeded locally, the maximum, theoretical power coefficient that can be achieved over the entire swept area of a horizontal-axis wind turbine is about 59.3%, known as the Betz limit. In practice, even at the optimal tip speed ratio, modern wind turbines rarely achieve a power coefficient over 50%, and more normally achieve power coefficients of around 45% to 48%.

The "tip speed ratio" (TSR or $\lambda$) of a wind turbine is ratio between the tangential speed of the tip of a blade and the actual velocity of the wind. The optimal or design TSR is the TSR at which the maximum $C_p$ of the wind turbine is achieved. The TSR is typically maintained at the design TSR below rated wind speed, but above rated wind speed the TSR decreases.

In one embodiment, the blade transitions from a local blade twist angle and/or aerodynamic shape of the radially-outer portion to a local blade twist angle and/or aerodynamic shape shaped to extract minimum energy from the wind.

The portion of the radially-inner portion that is shaped to extract minimum energy from the wind preferably comprises at least 50% of the length of the radially-inner portion of the blade. When the rotor is operating at its maximum power coefficient, the rotor preferably achieves an average power coefficient of below 10% for the area swept by the portion of the radially-inner portion shaped to extract minimum energy from the wind, and preferably below 5%.

Preferably at least this portion of the radially-inner portion of the blade is shaped such that a local blade twist angle and/or aerodynamic shape at each point along this portion of the radially-inner portion of the blade is approximately optimal for extracting minimal energy from the wind (e.g. within 2°, and preferably within 1°), when the rotor is operating at its maximum power coefficient. Optionally, the twist angle for a portion of the blade may be greater than the optimal angle for extracting minimal energy from the wind, such it acts as a propeller.

The radially-inner portion of the blade is preferably shaped for generating minimal drag when the rotor is operating at its maximum power coefficient.

The radially-outer portion is preferably shaped to extract high levels of energy from the wind. Thus, although the blade includes a portion extracting low energy at its centre, the outer portion of the blade (covering most of the swept area) still extracts high levels of energy achieving a high overall power coefficient for the blade.

Preferably both the radially-inner portion of the blade and the radially-outer portion of the blade have an aerofoil shape. Aerofoils with high aerodynamic performance are preferably applied in the blade design.

Preferably, the radially-outer portion is shaped such that a local blade twist angle and/or local aerodynamic blade shape at each point along the radially-outer portion of the blade is approximately optimal (e.g. within 2°, and preferably within 1°) for extracting energy from the wind, when the rotor is operating at its maximum power coefficient.

The radially-outer portion of the blade may be shaped such that, in use, when the rotor is operating at its maximum power coefficient, the rotor achieves a power coefficient of at least 40% for the area swept by the radially-outer portion, and preferably at least 45%. The power coefficient across the area swept by the radially-outer portion is preferably substantially uniform (e.g. within about 5%).

The present rotor blade is preferably shaped to achieve, in use when operating at its maximum power coefficient, an overall power coefficient of at least 30%, preferably at least 35%, more preferably at least 40% and most preferably at least 43%. Thus, the blade still has a relatively high power coefficient, despite the fact that low energy is extracted from the ventilated centre portion.

In one embodiment, the blade is for an offshore wind turbine. This blade configuration is particularly applicable to offshore wind turbines because of the relatively low terrain roughness, typically having roughness lengths of about $Z_0=0.0002$ m. The low terrain roughness means that the wind experiences low natural turbulence and so wakes diffuse over a longer distance. The blade may, however, also be applicable to on-shore wind turbines, and particularly for application in areas having terrain roughnesses in the same range as offshore sites, such as smooth arctic terrain without vegetation. For example, areas with roughness lengths of below $Z_0=0.005$ m.

Preferably the blade has a length of at least 50 metres. The present invention is particularly applicable to large rotor blades of the type used for electrical power generation in offshore wind farms.

In a preferred aspect, the present invention also provides a rotor for a horizontal-axis wind turbine rotor comprising a hub and at least two, preferably three, blades as described above mounted to the hub. The turbine is preferably a non-shrouded turbine.

Viewed from another aspect, the invention can be seen to provide a rotor for a horizontal-axis wind turbine, the rotor comprising a hub and two or more blades (preferably as described above) mounted to the hub, the blades being shape so that, when the rotor is operating at its maximum power coefficient, a first, radially-inner swept area of the rotor has a local power coefficient less than 10%, and a second, radially-outer swept area of the rotor has a local power coefficient greater than 40%.

Viewed from yet a further aspect, the present invention provides a horizontal-axis wind turbine comprising a tower, a nacelle mounted at the top of the tower, and a rotor as described above coupled to a generator of the nacelle to generate electrical power. As above, the wind turbine is an offshore wind turbine.

The invention also provides a wind farm comprising an array of horizontal-axis wind turbines, at least one of the wind turbines being a wind turbine as described above. The wind farm is preferably an offshore wind farm or an onshore wind farm located in a region having a roughness length of below $Z_0=0.005$ m.

A wind farm incorporating a blade as discussed above can achieve a noticeable increase in efficiency by incorporation of such. Faster dissolving wakes give a decreased turbine spacing, allowing the installation of more turbines for the same or less park wake losses in a given area. Park efficiency is thus increased.

Viewed from another aspect, the present invention provides a method of designing a rotor blade for a horizontal-axis wind turbine rotor, the method comprising: designing a radially-outer portion of the rotor blade so as to extract maximum power; and designing a radially-inner portion of the rotor blade to ventilate a central area of a wake of the rotor.

The method may comprise designing radially-inner portion of the rotor blade to extract minimum power and generating minimal drag, for example at a design TSR. Optionally, the method may comprise designing the rotor blade to impart energy in off-design conditions the blade may act at the outer sections as rotor and at inner sections as propeller enabling an energy transfer within the rotor area.

In practice, this method would be carried out using computational analysis, such as computational fluid dynamics (CFD) modelling and blade element momentum (BEM) modelling. Thus, the method is preferably a computer-assisted method of designing a rotor blade for a horizontal-axis wind turbine rotor.

Preferably, the radially-inner portion has an axial length of at least 15% and/or an axial length of less than 50%. In preferred embodiments, the axial length is between 15% and 40% of the length of the blade, preferably between 20% and 30% of the length of the blade, and most preferably between 20% and 25% of the length of the blade. Preferably the radially-outer portion has an axial length of at least 40 of the length of the blade, and preferably at least 50% of the length of the blade.

Preferably designing the radially-outer portion of the rotor blade comprises at least setting a local blade twist angle at all points along the radially-outer portion to an optimal angle of attack for maximum energy extraction. Preferably designing the radially-outer portion of the rotor blade also comprises setting a local blade aerodynamic shape at all points along the radially-outer portion to an optimal shape for maximum energy extraction.

The radially outer portion of the blade is preferably designed to achieve a substantially uniform power coefficient across the area swept by the radially-outer portion.

Preferably designing the radially-inner portion of the blade comprises at least setting a local blade twist angle at all points along part of the radially-inner portion to an optimal angle of attack to minimise drag and to minimise energy extraction or to act as a propeller.

The part of the radially-inner portion of the blade designed for minimal drag and energy extraction is preferably designed to achieve smooth power coefficient gradient across the area swept by that part.

Designing the radially-inner portion of the blade may further comprise designing a smooth transition portion between the radially-outer portion and the part of the radially-inner portion designed to minimise energy extraction and drag generation.

The blade design may comprise designing the blade to achieve any or all of the features described above.

Viewed from a further aspect, the present invention provides a method of manufacturing a rotor blade for a horizontal-axis wind turbine rotor, the method comprising: creating a design for a rotor blade by the method described above and manufacturing a rotor blade to the design.

Certain preferred embodiments of the invention will now be discussed in greater detail by way of example only and with reference to the accompanying drawings, in which:

FIG. 2 illustrates three blades of a wind turbine according to an embodiment of the present invention;

FIGS. 9A to 9C are graphs showing normalised air speed profiles at four locations downwind of each of the reference test rotor, the first ventilated test rotor and the third ventilated test rotor, respectively;

Figure 10:
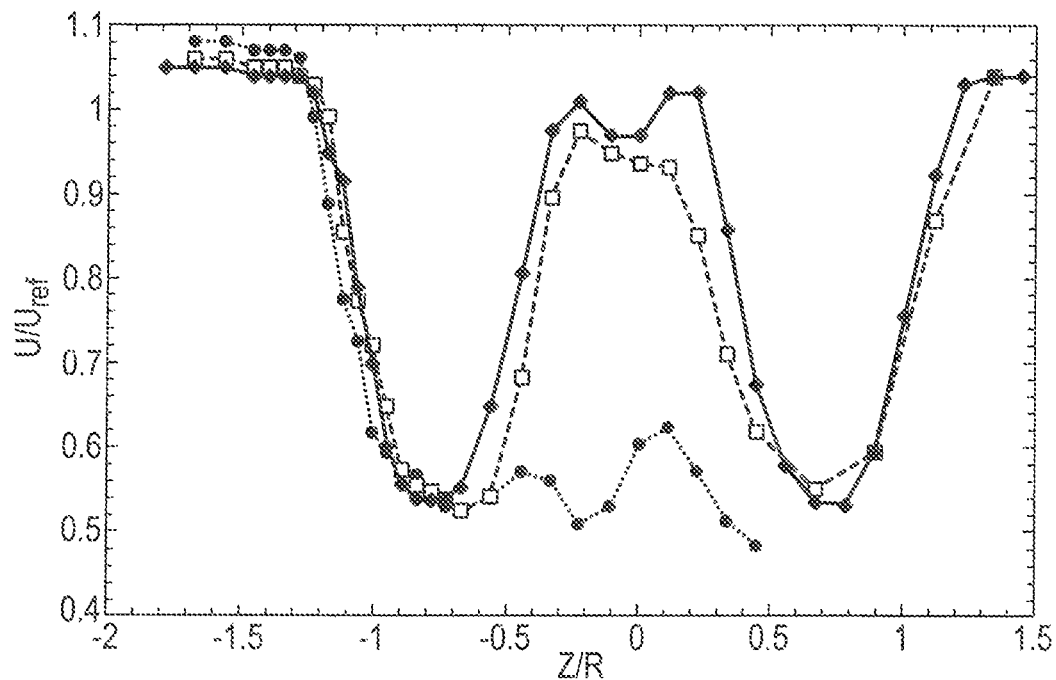
Figure 11:
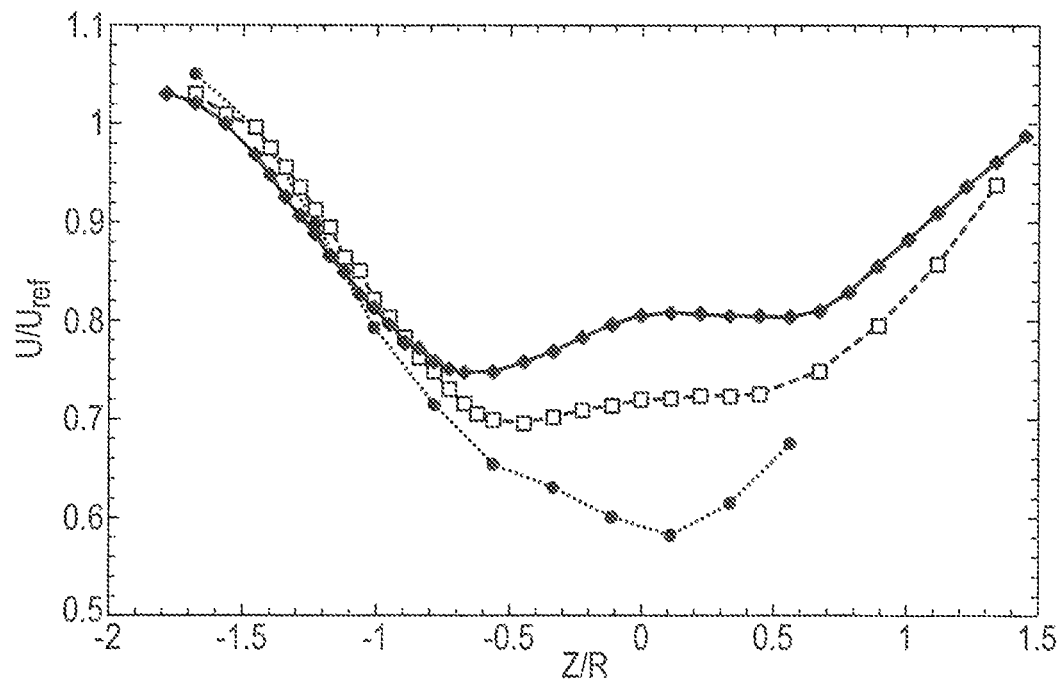

FIG. 10 is a graph comparing the normalised air speed profiles of each of the reference test rotor, the first ventilated test rotor and the third ventilated test rotor, at a distance of two turbine diameters downwind of the rotor; and FIG. 11 is a graph comparing the normalised air speed profiles of each of the reference test rotor, the first ventilated test rotor and the third ventilated test rotor, at a distance of seven and a half turbine diameters downwind of the rotor.

Figure 1:
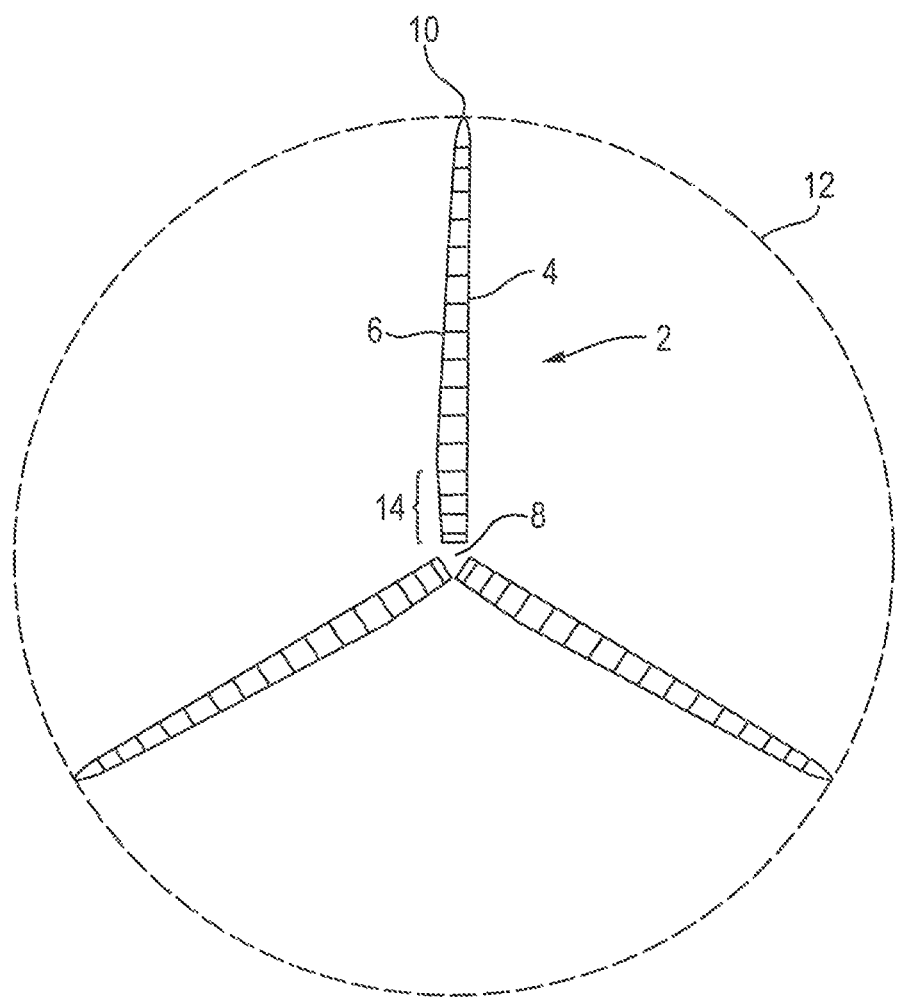
FIG. 1 illustrates three blades of a prior art wind turbine.

FIG. 1 illustrates an example of typical blades 2 for a conventional rotor of a horizontal-axis wind turbine.

The rotor comprises three blades 2 of identical shape. Each blade 2 is an aerofoil (with a radial-varying aerodynamically shaped section along its length) having a leading edge 4 and a trailing edge 6, which extend from a radially-inner root 8 of the blade 2 to a radially-outer tip 10. The blades 2 of the rotor are mounted via their roots 8 on a hub (not shown) such that, when wind passes through the rotor, lift is generated by each of the blades 2 in a direction perpendicular to the wind direction, causing the rotor to rotate.

In order to extract maximum energy from the wind, modern wind turbine blades 2 have a twist (of locally optimized aerofoils) along their length. This is because the optimal angle of attack of the blade 2 is primarily affected by the apparent local wind direction, which changes with radial position because local speed of the blade increases with increasing radial position. Thus, as the tip 10 of the blade 2 travels much faster than segments of the blade 2 closer to the hub of the rotor, the blades 2 incorporate a twist along their length so as to achieve the optimal angle of attack along the full length of the turbine blade 2.

It is noted that the radial blade angle of attack distribution will only be optimal at the wind turbine's design tip speed ratio (TSR). Usually a rotor is designed based on the annual mean wind speed (e.g. in the North Sea, a wind speed of about 10 m/s) and a design TSR (e.g. a TSR of about 8 to 9). The rotor will be operated to achieve a constant TSR, at the design TSR, ideally from start-up up to rated wind speed (e.g. 12 m/s in the North Sea example), which will ensure optimal performance. Thus, during operation below the rated speed, the angle between the wind vector and the rotational speed vector does not change due to this constant TSR operation. Above the rated speed, the wind turbine blades are pitched to reduce the energy extracted from the wind in order to prevent excessive power production in the generator and damage to the wind turbine structure.

The blades 2 of the wind turbine are usually designed so as to extract substantially uniform energy, i.e. to have a substantially uniform power coefficient, across the swept area 12 of the rotor except the blade tip and root area. This achieves the highest coefficient of power for the swept area overall. A uniform power coefficient is achieved by increasing the chord length of the blade with decreasing radius (as can be seen in FIG. 1), so as to extract equal energy at the slower speeds as at the higher speeds.

For manufacturing reasons, a radially-inner portion 14 of the blade 2 is often designed with a shorter chord length than the chord length required to achieve the uniform power coefficient for the corresponding swept area. This is because the chord lengths required for uniform energy extraction at short radii are very high, and in some cases are beyond transport or manufacturing capabilities. Also, due to the non-linear nature of aerodynamics, highly complex aerodynamic designs are required to achieve sufficient power generation at short radii. However, the angle of attack of the radially-inner portion 14 is still at the optimal angle of attack and the radially-inner portion still achieves a moderate power coefficient.

FIG. 2 illustrates three blades 20 for a three-bladed rotor of a horizontal-axis wind turbine, in accordance with an embodiment of the present invention.

As above, each blade 20 defines an aerofoil having a leading edge 22 and a trailing edge 24, which extend from a root 26 of the blade 20 to the tip 28 of the blade 20. However, in this embodiment, the blade 20 is designed such that a radially-inner portion 30 of the blade (such as 20% to 25% of its length) extracts reduced kinetic energy from the wind such that a ventilation effect is created. A radially-outer portion 32 of the blade 20 is still designed of extract maximum levels of energy from the wind passing through its swept area.

This blade configuration means that the centre of the turbine wake contains more kinetic energy compared to the wake from a conventional rotor design, as in FIG. 1. This increased wind flow velocity at the centre of the wake generates additional shear stresses, with corresponding turbulence development, which gives rise to increased wake diffusion.

The main effect of the ventilation or bypass flow through the central area 34 is the addition of momentum due to the jet of relatively high-speed air emanating from the centre of the rear of the turbine. This jet flow, which is partly driven by the pressure difference between the increased pressure upstream of the rotor and the lower pressure downstream of the rotor, generates turbulent mixing effects in the centre of the wake.

In order to achieve this ventilation effect, the blade shape of the radially-inner portion 30, at the rotor centre, is twisted and streamlined, see FIG. 2. Through these measures, a central ventilated area 34 of the rotor swept area 36 has a low power coefficient, i.e. it does not extract substantial kinetic energy from the wind, compared with a radially-outer portion 38 of the swept area 36 of the rotor. Where the radially-inner portion 30 is shaped to achieve minimal energy extraction in design conditions, then in off-design conditions where the TSR is greater than the design TSR, the inner part 30 can act as a propeller and add energy to the flow. Thus, the energy in the rotor plane is redistributed.

For the design shown in FIG. 2, the radially-outer portion 32 achieves a high power coefficient of about 40% across its swept area 38. The power coefficient is substantially uniform (i.e. within about 5%) across this swept area 38 under optimal conditions.

The radially-inner portion 30 achieves a low power coefficient across its swept area having an average value below 10%.

The radially-inner portion 30 ideally extracts minimal energy from the wind. However, for aerodynamic reasons, the radially-inner portion 30 includes a transition portion where the blade twists from the angle at the inner end of the radially-outer portion 32 to a blade angle for minimum energy extraction. The transition portion of the radially-inner portion 30 is about 10% of the length of the blade. The remainder of the radially-inner portion 30 is shaped to achieve a substantially uniform (i.e. within about 5%) power coefficient of below 5% across this swept area 34 under optimal conditions.

The central ventilated area 34 accounts for approximately 4% to 6% of the total swept area 36 of the rotor. Thus, as a conventional rotor aims to achieve a substantially uniform power coefficient, the loss of efficiency of the turbine compared to a conventional rotor is also approximately 4% to 6%, although even in a conventional rotor, the radially-inner portion 14 of the rotor has a slightly low power coefficient and so the actual power loss may be lower. In off-design conditions, the power coefficient might become negative and the inner section acts as a propeller.

In operation, the wind flow through the central area 32 is increased (compared to a conventional rotor) and a respective inner part of the wake behind turbine is energized. The flow field behind a rotor comprises the outer flow field of the wake, due to energy extracted from the radially-outer portion 38 of the swept area 36, and the inner energized area. Mixing effects and turbulence increase due to the increased kinetic energy of the inner wake area and the wind speed recovery rate behind the turbine can increased by up to 20%.

For offshore wind farms, this reduction in wind speed recovery distance improves the efficiency of other turbines in the array sufficiently to offsets the individual power loss from each turbine. Depending of the configuration of the array, the total power production of the farm may increase by up to 3% when using the rotor blades of this embodiment. Alternatively, this configuration enables higher turbine densities to be exploited.

Figure 3A:
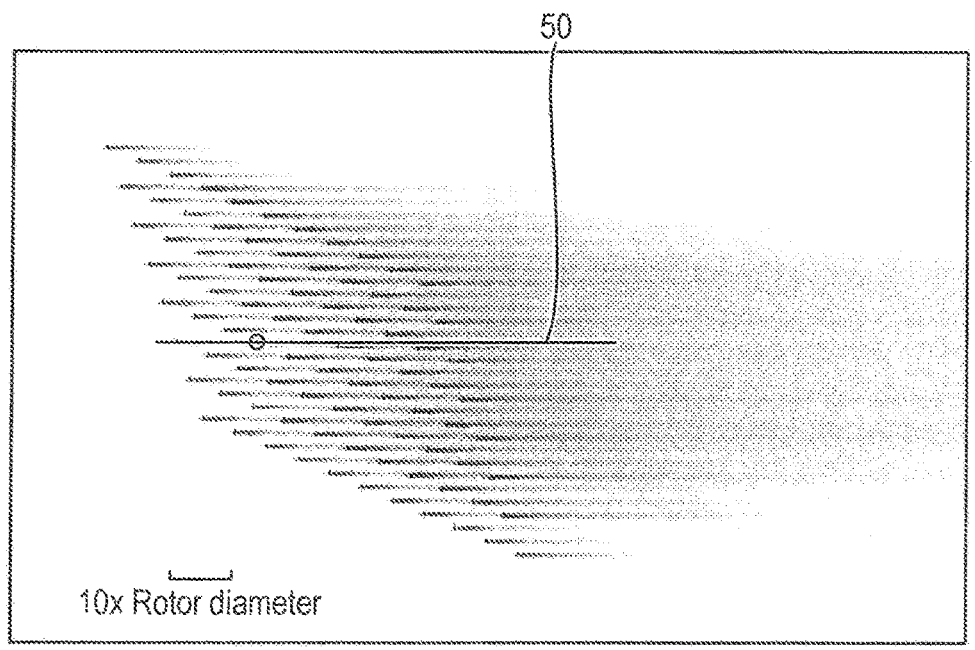
FIG. 3A is a plan view of a simulated wind farm showing wakes of the wind turbines within the wind farm.
Figure 3B:
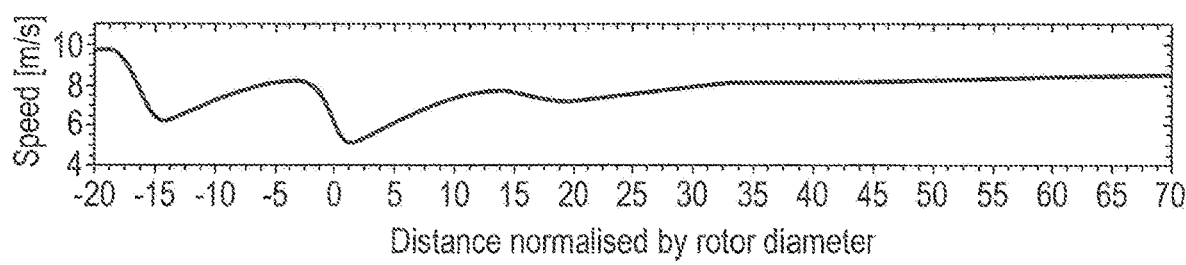
FIG. 3B is a graph showing how wind velocity varies though the wind farm along the line shown in FIG. 3A.

FIG. 3A is a plan view of the Sheringham Shoal wind farm. FUGA® simulated wakes of each turbine are illustrated, with darker shading equating to lower wind speed. FIG. 3B illustrates wind speeds along the line 50 shown in FIG. 3A.

Sheringham Shoal wind farm has a typical annual energy production in the range of 1100 GWh. Successful application of the wind turbine blade design discussed above would be expected to increase the annual energy production by up to 34 GWh (equivalent to 1.7 m GBP per year, based on a UK spot price of 50 £/MWh).

In order to test the concept, a set of three rotors was designed based on the BEM theory and tested in a wind tunnel. The set consists of a standard rotor and two ventilated rotors. Each rotor comprised three blades of identical shape. In the rotor design, the operation at low Reynolds numbers and compressibility effects were accounted for. The blades tested had a length of 0.4 meters. However, at full scale, the blades would have a length in the region of 50 to 75 meters.

Figure 4A:
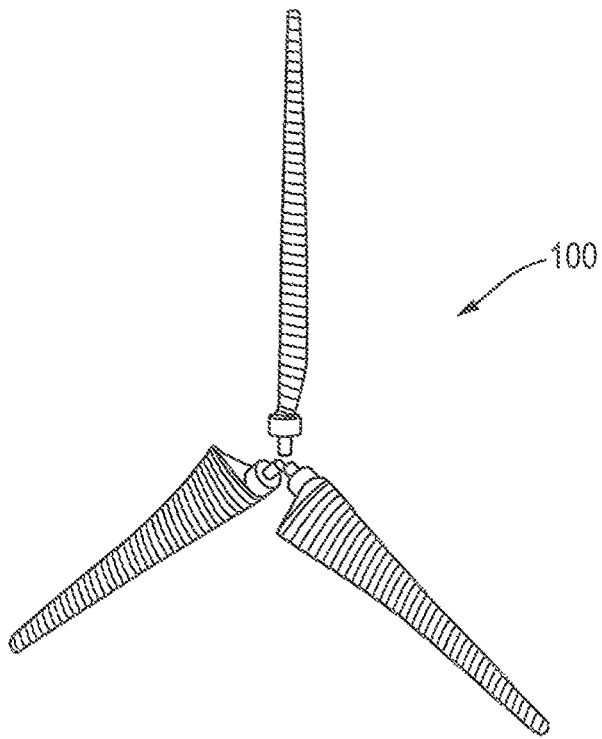
FIG. 4A is a perspective view of three blades for a reference test rotor.
Figure 4B:
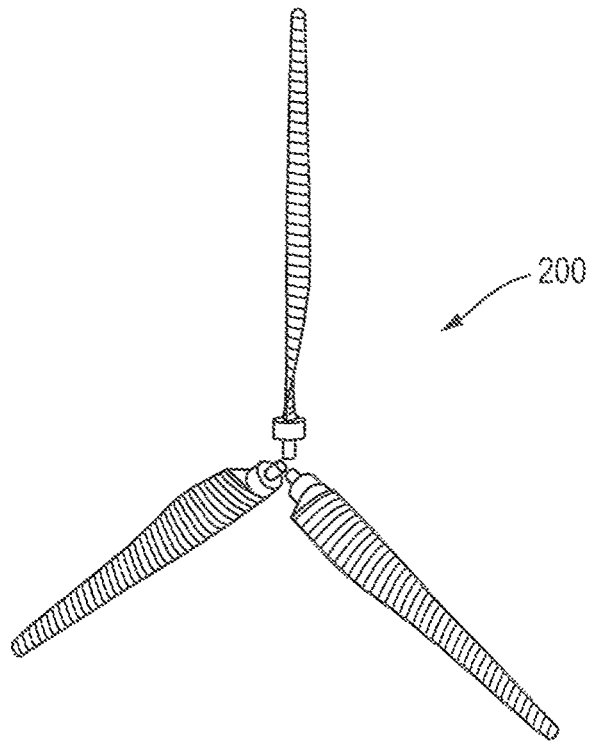
FIG. 4B is a perspective view of three blades for a first ventilated test rotor.
Figure 5:
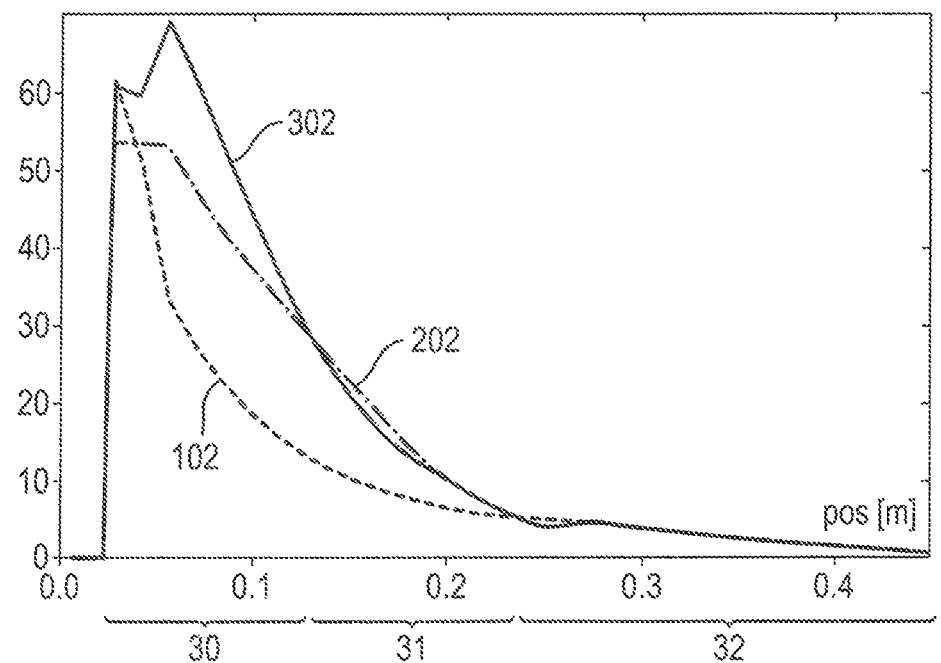
FIG. 5 is a graph showing blade twist angles with respect to radial position along the blade of a blade of the reference test rotor and a blade of the first ventilated test rotor, and a blade of a second ventilated test rotor.
Figure 6:
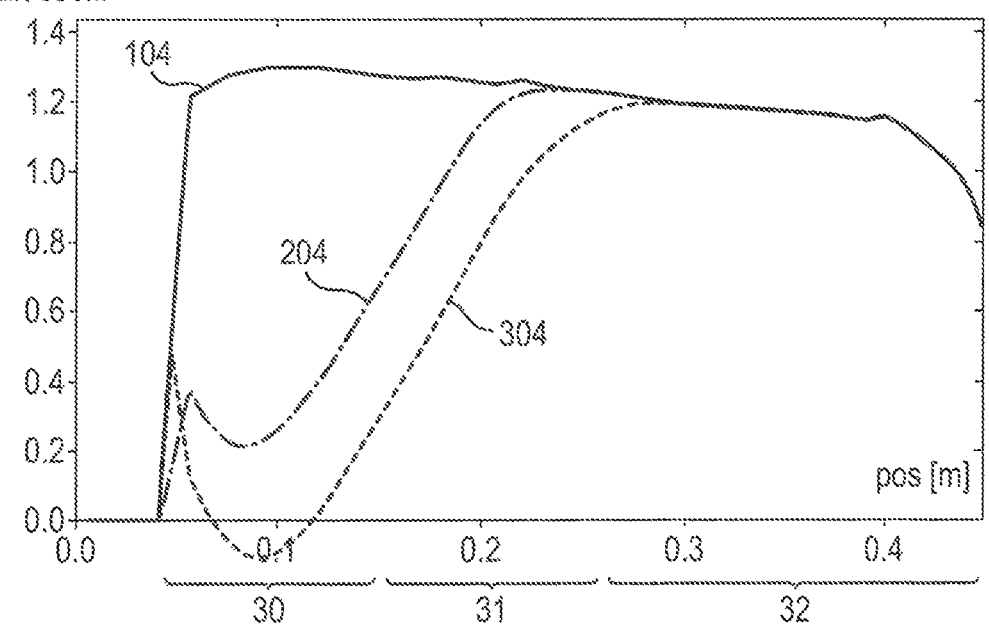
FIG. 6 is a graph showing predicted lift coefficient at a TSR of 5.5 with respect to radial position along the blade for the three blades.

FIGS. 4A and 4B illustrate the blades of two of these rotors 100, 200 (the blades of the third rotor 300 are visually difficult to distinguish from those of the second rotor 200 and so are not shown here). FIG. 5 shows the blade twist angles of the three rotors 100, 200, 300 with respect to the radial position along the blades. FIG. 6 shows the BEM predicted local lift coefficients of each of the rotors 100, 200, 300 with respect to the radial position along the blade.

The first rotor 100 was a standard or reference rotor 100, as illustrated in FIG. 4A. This rotor 100 was designed to optimise the coefficient of power for a TSR of 6. Its blade twist angle is shown as line 102 in FIG. 5. As can be seen from line 104 in FIG. 6, the lift coefficient of the blades is relatively even across their lengths. This rotor 100 is therefore a standard rotor with good performance.

The second rotor 200 was designed to provide a ventilated centre. This rotor 200 was designed to minimise the extraction of energy by tuning the twist angle θ. In order to minimise the energy extracted at the design TSR, the design twist angle is initially set equal to the angle of attack, given by:

$$\theta(r) = a\tan\left(\frac{1}{TSR \cdot \frac{r}{R}}\right)$$

where:
TSR=tip speed ratio
R=rotor radius
r=radial position

It is noted that this basic equation is valid only for a symmetric aerofoil, where no lift generation at zero angle of attack takes place. For asymmetric foils, the respective angles for zero lift generation would have to be taken into account in an optimization.

Line 202 FIG. 4B and line 204 in FIG. 5 show that the chord length and blade twist angle of the radially outer portion 32 of the blades are similar to those of the blades of the first rotor 100. However, for the radially inner portion 30, the twist angle is higher than for the reference rotor 100 and the blade chord length is shorter than for the reference rotor 100. These combine to result in a significant lower lift coefficient of the radially inner portion, as can be seen in FIG. 6.

Between the radially inner portion 30 and the radially outer portion 32 is a transition portion 31 where the blade's twist angle and chord length transition from an angle that minimises energy extraction to an angle that maximises energy extraction.

The third rotor 300 was designed also to provide a ventilated centre. This rotor 300 was designed to increase the ventilation of the wake compared to the second rotor 200. The radially inner part 30 of the rotor 300 is shaped to give negative axial induction. That is to say, this portion 30 of the rotor 300 works as a propeller to transfer additional energy into the wake.

As can be seen from line 302 FIG. 5, the blade twist angle of the radially innermost portion 30 is higher even than for the first ventilated rotor 200. This further reduces the lift coefficient, as can be seen from lien 304 in FIG. 6, which in fact goes negative for part of the blade where the blade acts as a propeller.

Figure 7:
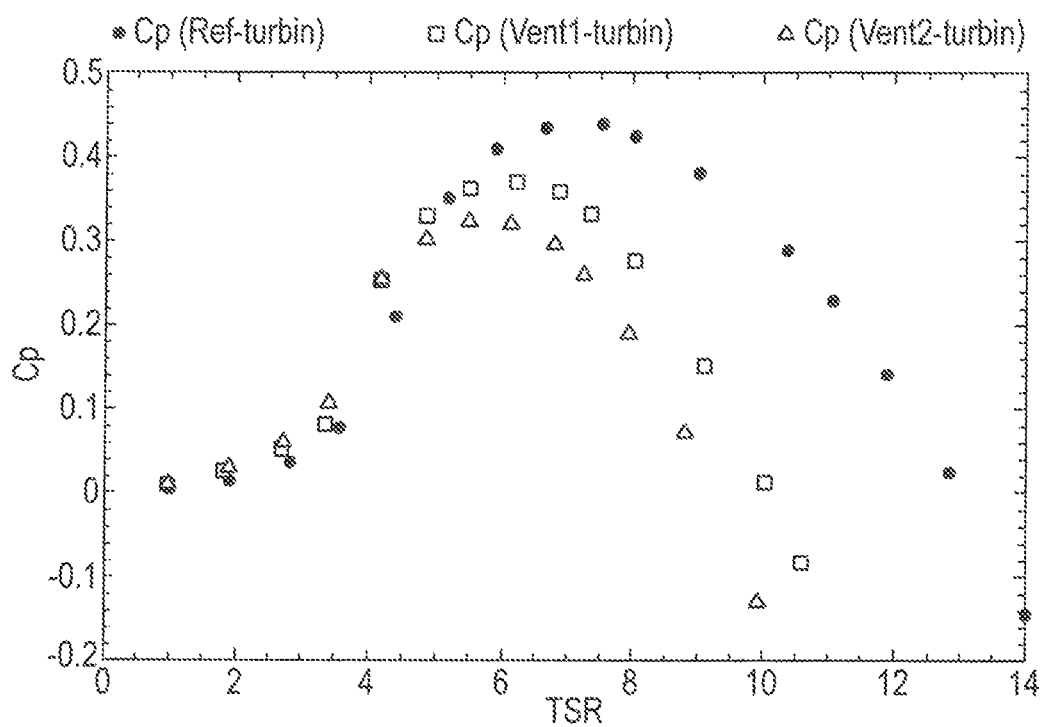
FIG. 7 is a graph showing a measured power coefficient with respect to TSR for the three test rotors.
Figure 8:
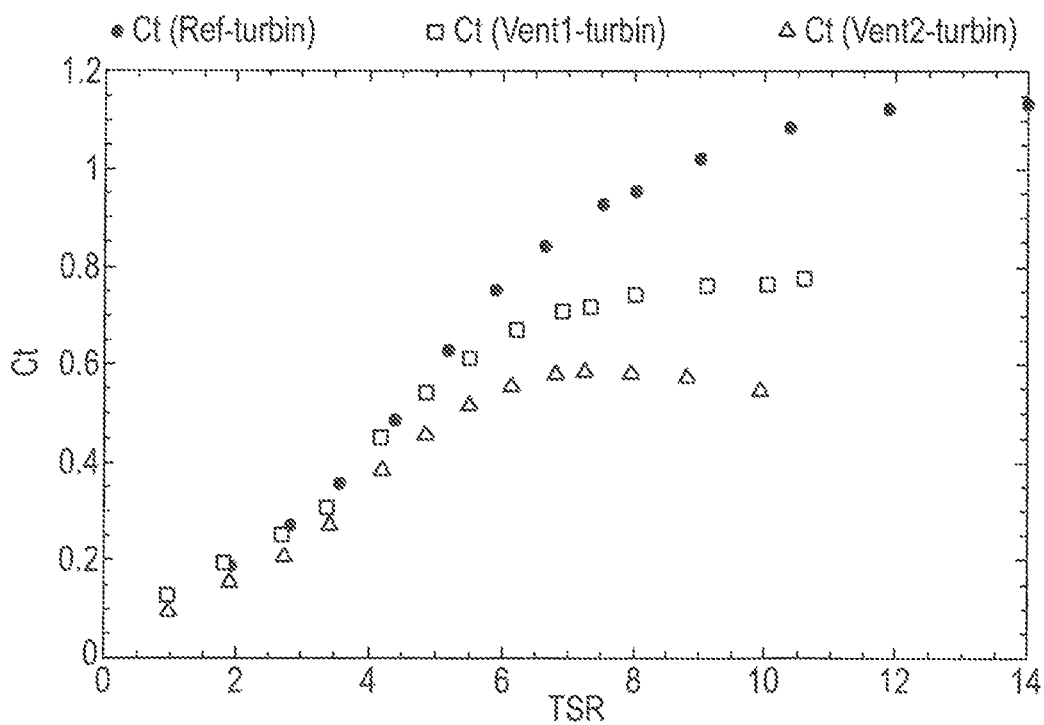
FIG. 8 is a graph showing a measured thrust coefficient with respect to TSR for the three test rotors.

The power coefficients ($C_p$) and the thrust coefficients ($C_t$) of the rotors 100, 200, 300 were measured during the wind tunnel tests at a number of TSR values and the results are shown in FIGS. 7 and 8, respectively.

The reference rotor 100 reached a maximum power coefficient of $C_p$=0.44, with a respective $C_t$=0.8, which are typical values for a conventional wind turbine rotor. The first ventilated rotor 200 and the second ventilated rotor 300 reached respective maximums of $C_p$=0.42 and $C_p$=0.37. These corresponded to a reduction of approximately 5% and approximately 16%, respectively. The reduction in efficiency was due to the ventilation of inner rotor sections, where the kinetic energy of the flow is not extracted.

Figure 9A:
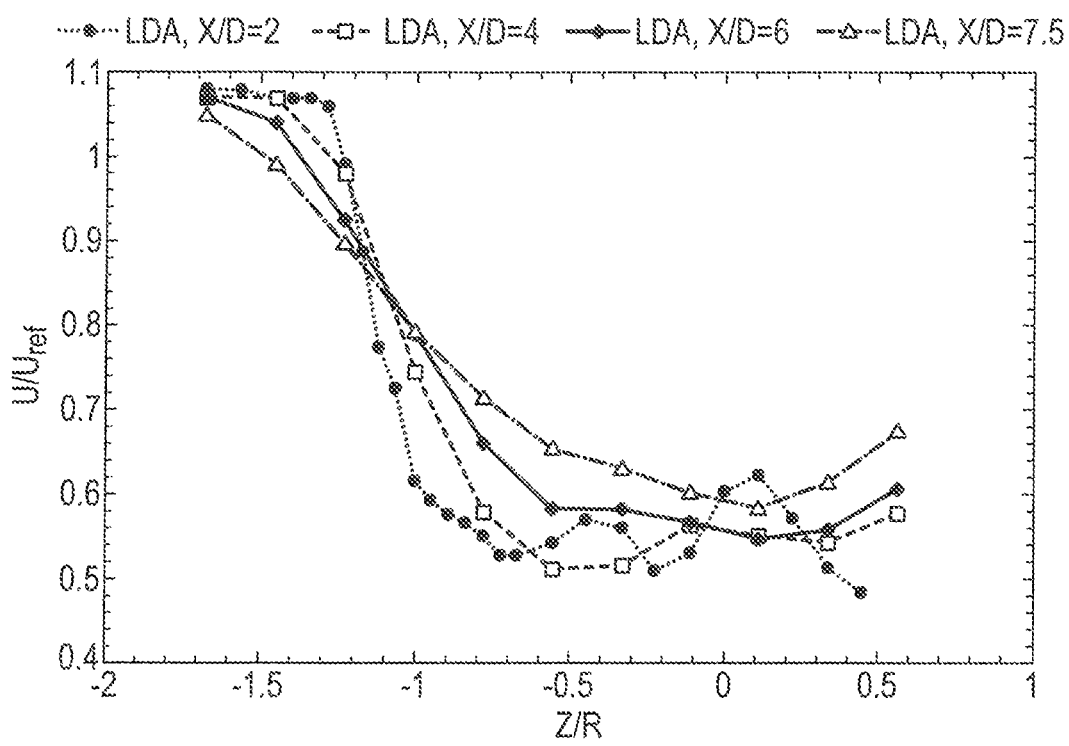
Figure 9B:
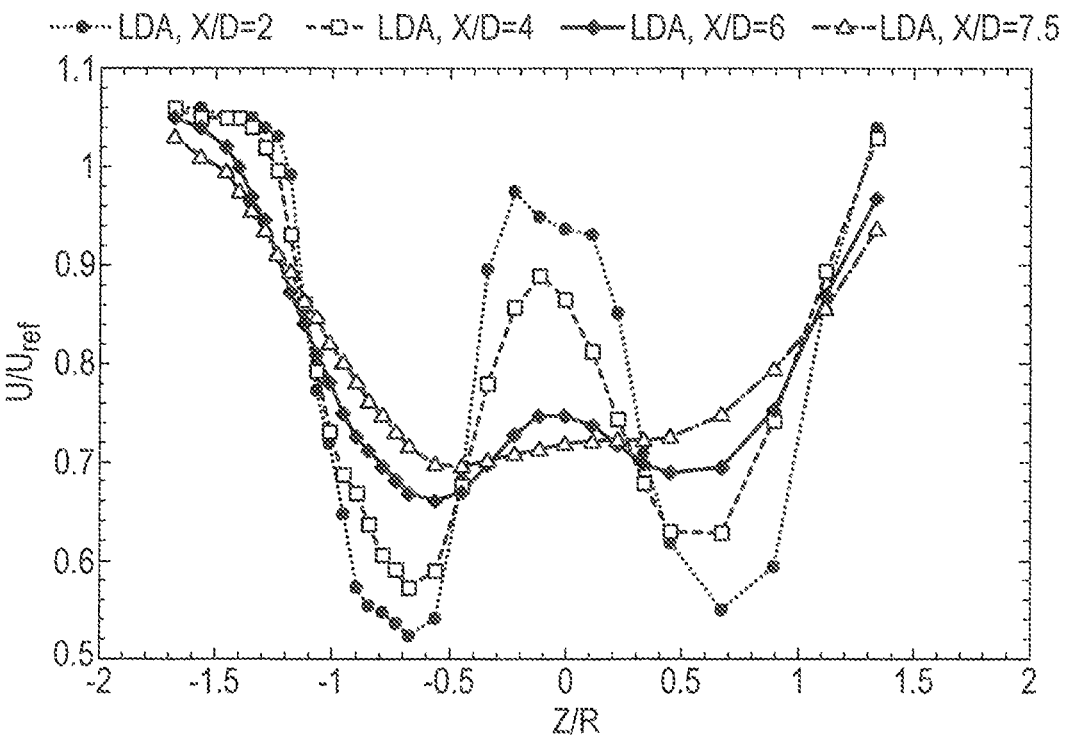

The air speed profile was also measured at locations of 2, 4, 6 and 7.5 turbine diameters downwind of the rotors. The airspeed was normalised with respect to the reference speed (the air speed upstream of the turbine) and the results are shown in FIGS. 9A to 9C for the reference rotor 100, the first ventilated rotor 200 and the second ventilated rotor 300. In the drawings, X is the distance downwind of the rotor, Z is the height above the central axis of the rotor, and U is the air speed in the X direction.

The wake of the reference rotor 100 does not significantly dissipate, with the air speed remaining low at the centre of the wake along the entire tested length. Conversely, from a distance of 6 rotor diameters, both the first and second ventilated rotors 200, 300 demonstrate significant wake diffusion.

For comparative purposes, FIG. 10 shows the wind speed profiles of the three test rotors 100, 200, 300 immediately downwind of the rotors at 2 rotor diameters and FIG. 11 shows the wind speed profiles of the three test rotors 100, 200, 300 further downwind of the rotors at 7.5 rotor diameters.

As will be appreciated, the average speed of the air downstream of the ventilated rotors 200, 300 is significantly higher than that downstream of the reference rotor 100. This permits improved energy extraction from the wind by a turbine downwind.

The invention claimed is:

1. A blade for a horizontal-axis wind turbine rotor, the blade comprising a radially-outer, energy-extraction portion, a radially-inner, ventilation portion, and a transition portion between the radially-inner portion and the radially-outer portion, wherein the radially-inner ventilation portion is shaped to, in use, ventilate a central area of a wake of the rotor by extracting low levels of energy from the wind,
    wherein the blade is a unitary blade,
    wherein the blade has a length of at least 50 meters,
    wherein the radially-inner portion has an axial length of greater than 15% of the length of the blade,
    wherein, in the transition portion, a local blade twist angle of the blade gradually transitions from a local blade twist angle of the radially-outer portion to a local blade twist angle of the radially-inner portion, and
    wherein, in the transition portion, an aerodynamic shape of the blade gradually transitions from an aerodynamic shape of the radially-outer portion to an aerodynamic shape of the radially-inner portion.

2. A blade according to claim 1, wherein the radially-inner portion has an axial length of less than 50% of the length of the blade.

3. A blade according to claim 2, wherein the radially-inner portion of the blade is shaped so as to, in use, extract less than 2% of the total energy extracted by the blade.

4. A blade according to claim 1, wherein the radially-inner ventilation portion is shaped such that, in use at rated wind speed, the wind in the central area of the wake immediately downwind of the rotor has a velocity at least 80% of the velocity of the wind immediately upwind of the rotor.

5. A blade according to claim 1, wherein the radially-inner portion of the blade has a local blade twist angle and/or aerodynamic shape that is not optimal for extracting maximum energy from the wind.

6. A blade according to claim 1, wherein the radially-inner portion of the blade is shaped such that, when the rotor is operating at its maximum power coefficient, the rotor achieves an average power coefficient of below 15% for the area swept by the radially-inner portion.

7. A blade according to claim 1, wherein the radially-outer portion is shaped such that a local blade twist angle and local blade shape at each point along the radially-outer portion of the blade is approximately optimal for extracting energy from the wind, when the rotor is in use and operating at its maximum power coefficient.

8. A blade according to claim 1, wherein the radially-outer portion of the blade is shaped such that, in use, when the rotor is operating at its maximum power coefficient, the rotor achieves an average power coefficient of at least 40% for the area swept by the radially-outer portion.

9. A rotor for a horizontal-axis wind turbine rotor comprising a hub and at least two blades according to claim 1 mounted to the hub.

10. A horizontal-axis wind turbine comprising a tower, a nacelle mounted at the top of the tower, and a rotor according to claim 9, the rotor being coupled to a generator of the nacelle to generate electrical power.

11. An array of horizontal-axis wind turbines, at least one of the wind turbines being a wind turbine according to claim 10.

12. A method of manufacturing a rotor blade for a horizontal-axis wind turbine rotor, the method comprising:
    creating a design for a rotor blade by a computer-assisted method comprising:
        designing a radially-outer portion of the rotor blade so as to extract maximum power from the wind;
        designing a radially-inner portion of the rotor blade so as to ventilate a central area of a wake of the rotor by extracting low power from the wind or imparting energy to the wake, and by generating low drag; and
        designing a transition portion between the radially-inner portion and the radially-outer portion,
    wherein the blade is a unitary blade,
    wherein the blade has a length of at least 50 meters,
    the radially-inner portion has an axial length of greater than 15% of the length of the blade,
    wherein, in the transition portion, a local blade twist angle of the blade gradually transitions from a local blade twist angle of the radially-outer portion to a local blade twist angle of the radially-inner portion, and
    wherein, in the transition portion, an aerodynamic shape of the blade gradually transitions from an aerodynamic shape of the radially-outer portion to an aerodynamic shape of the radially-inner portion; and
    manufacturing a rotor blade to the design.

13. A method according to claim 12, wherein the radially-inner portion has an axial length of less than 50% of the length of the blade.

14. A method according to claim 12, wherein designing the radially-outer portion of the rotor blade comprises at least setting a local blade twist angle at all points along the radially-outer portion to an optimal angle of attack for energy extraction.

15. A method according to claim 12, wherein designing the radially-inner portion of the blade comprises setting a local blade twist angle at all points along at least part of the radially-inner portion to an optimal angle of attack to minimize energy extraction.

16. A horizontal-axis wind turbine according to claim 10, wherein the horizontal-axis wind turbine is an offshore horizontal-axis wind turbine.

\* \* \* \* \*